United States Patent
Kim et al.

(12) 
(10) Patent No.: US 7,601,776 B2
(45) Date of Patent: Oct. 13, 2009

(54) AQUEOUS COATING COMPOSITION FOR PLASTIC AUTOMOTIVE INTERIORS

(75) Inventors: Ok Kim, Yongin-si (KR); Yong Chun, Yongin-si (KR); Young-Ho Cho, Anyang-si (KR); Kang-Moon Jin, Anyang-si (KR); Jae-Beom Ahn, Anyang-si (KR); Cheol-Hee Cho, Gunpo-si (KR)

(73) Assignees: Hyundai Mobis Co., Ltd., Seoul (KR); Daihan Bee Chemical Co., Ltd., Anyang-si (KR)

( * ) Notice: Subject to any disclaimer, the term of this patent is extended or adjusted under 35 U.S.C. 154(b) by 496 days.

(21) Appl. No.: 11/426,601

(22) Filed: Jun. 27, 2006

(65) Prior Publication Data

US 2007/0049683 A1    Mar. 1, 2007

(30) Foreign Application Priority Data

Aug. 25, 2005   (KR) ...................... 10-2005-0078111

(51) Int. Cl.
*C08G 18/00* (2006.01)
(52) U.S. Cl. .................. 524/500; 524/493; 524/62; 524/261; 524/315; 524/430
(58) Field of Classification Search ........................ None
See application file for complete search history.

(56) References Cited

U.S. PATENT DOCUMENTS 6,329,060 B1* 12/2001 Barkac et al. ............ 428/423.1
6,472,493 B1* 10/2002 Huynh-Ba ................... 528/49
6,919,109 B2* 7/2005 Nakano et al. ........... 428/32.26

FOREIGN PATENT DOCUMENTS

KR    20-0240342    10/2001

OTHER PUBLICATIONS

Hara et al., 1991-372752, Derwent Abstract for JP03250063 A, Nov. 7, 1991.*
Bosch et al., 2000-377373, Derwent Abstract for DE19851576 A1, May 11, 2000.*
English Language Abstract of KR 20-0240342.

* cited by examiner

*Primary Examiner*—David Wu
*Assistant Examiner*—Satya B Sastri
(74) *Attorney, Agent, or Firm*—Greenblum & Bernstein, P.L.C.

(57) ABSTRACT

Disclosed herein is an aqueous coating composition for plastic automotive interiors, including 1) a component selected from the group consisting of aqueous polyurethane resins, aqueous acrylic resins, and mixtures thereof, 2) an aqueous polyurethane resin having a hydroxyl group, 3) a micronized silica dispersant having an average particle size of 10~30 μm, 4) a polyethylene paraffin wax dispersant having an average particle size of 30~100 nm, 5) a polysiloxane surface controlling agent, 6) a polyoxyethylene sorbitan monooleate stabilizer, 7) capsulated aromatic particles, and 8) a trifunctional hexamethylenediisocyanate curing agent having a hydrophilic group.

2 Claims, No Drawings

AQUEOUS COATING COMPOSITION FOR PLASTIC AUTOMOTIVE INTERIORS

CROSS-REFERENCE TO RELATED APPLICATIONS

The present application is based on, and claims priority from, Korean Application Serial Number 10-2005-0078111, filed on Aug. 25, 2005, the disclosure of which is hereby incorporated by reference herein in its entirety.

FIELD OF THE INVENTION

The present invention relates to an aqueous coating composition for plastic automotive interiors.

BACKGROUND OF THE INVENTION

Plastics used for automotive interiors are weakly resistant to deformation by chemicals, corrosion, UV light or heat in terms of the properties thereof, and have surface defects such as scratches, poor surface quality, limited colors, etc., caused upon injection molding, in terms of the outer appearance thereof. Therefore, in order to alleviate such defects of plastics, a process of applying a solvent-based acrylic lacquer onto the surface of plastics has been conventionally employed.

However, the solvent-based acrylic lacquer is a two-component solvent-based coating comprising an acryl or polyester coating having 10~30 wt % of a solid content and an isocyanate curing agent. The large amounts of organic solvents contained in the solvent-based coating generate volatile organic compounds (VOCs), thus causing environmental contamination and offensive odors and aggravating the health of workers. Hence, the use of organic solvents is restricted by various environmental laws in foreign countries. Thorough attempts to decrease the amount of solvent used when making a coating have been continuously made according to environmental protection programs led by developed countries.

In addition, the solvent-based acrylic lacquer, that is, an oil coating, suffers because a coating film formed thereof has a cool and hard feeling when contacted by a user, thus resulting in a much poorer texture compared to the texture of natural leather.

With the intention of solving the problems, an aqueous coating has been used instead of the oil coating in the field of plastic parts for automotive interiors. The application of the aqueous coating has received great attention in terms of decreasing the amount of VOCs. Further, the aqueous coating is advantageous from points of view of health and the environment, and as well, may overcome cracks or corrosion of the surface of plastics due to the attack of constituents of the solvent-based coating, for example, a strong solvent such as xylene or methylisobutylketone.

Therefore, the aqueous coating is used in the field of plastic parts for automotive interiors, thereby solving the conventional problems. However, the aqueous coating is disadvantageous because offensive odors are still caused by the presence of the non-reactive monomer of the aqueous acrylic resin used for the aqueous coating and the solvent for use in the formation of the coating film. Therefore, the removal of such odors is required.

SUMMARY OF THE INVENTION

Leading to the present invention, intensive and thorough research into methods of manufacturing a coating film, capable of having a soft feeling similar to natural leather upon contact with a user, using an aqueous coating composition in the field of plastic parts for automotive interiors and of decreasing offensive odors resulting from the presence of a non-reactive monomer of an aqueous acrylic resin and a solvent for formation of the coating film, carried out by the present inventors aiming to avoid the problems encountered in the related art, resulted in the creation of capsulated aromatic particles contained in the aqueous coating composition, thereby drastically decreasing odors resulting from the presence of the non-reactive monomer of the aqueous acrylic resin and the solvent for formation of the coating film.

Embodiments of the present invention improve the aqueous coating composition for use in plastic automotive interiors.

DETAILED DESCRIPTION OF THE PREFERRED EMBODIMENTS

The present invention provides an aqueous coating composition for plastic automotive interiors, comprising 1) 35~60 wt % of a component selected from the group consisting of aqueous polyurethane resins, aqueous acrylic resins, and mixtures thereof, 2) 5~20 wt % of an aqueous polyurethane resin having a hydroxyl group, 3) 5~20 wt % of a micronized silica dispersant having an average particle size of 10~30 μm, 4) 0.5~5 wt % of a polyethylene paraffin wax dispersant having an average particle size of 30~100 nm, 5) 0.5~5 wt % of a polysiloxane surface controlling agent, 6) 0.5~5 wt % of a polyoxyethylene sorbitan monooleate stabilizer, 7) 0.0~1 wt % of capsulated aromatic particles, and 8) 5~20 wt % of a trifunctional hexamethylenediisocyanate curing agent having a hydrophilic group.

Hereinafter, a detailed description will be given of the present invention.

The resin used in the aqueous coating composition for plastic automotive interiors of the present invention is selected from the group consisting of aqueous polyurethane resins, aqueous acrylic resins, and mixtures thereof. The aqueous polyurethane resin greatly affects the flexibility and adhesion performance of a coating film, and has a number average molecular weight of 10,000~100,000 elongation of 200~500 kg/cm$^2$, and a particle size of 0.001~0.1 nm. In addition, the aqueous acrylic resin contributes to the properties of the coating film, such as strength, weather resistance, scratch resistance, and chemical resistance, and has a number average molecular weight of 20,000~40,000, a glass transition temperature of 60~100° C., and a particle size of 0.1~100 nm. As such, the component selected from the group consisting of aqueous polyurethane resins, aqueous acrylic resins, and mixtures thereof is preferably contained in an amount of 35~60 wt %, based on the total weight of the aqueous coating composition. If the amount of resin is less than 35 wt %, adhesion to a substrate and texture are deteriorated. On the other hand, if the amount exceeds 60 wt %, it is difficult to reproduce the matte effect of the coating film.

The aqueous polyurethane resin having a hydroxyl group used in the aqueous coating composition of the present invention functions to form a crosslinked structure via the reaction of the hydroxyl group thereof with a curing agent. Thus, as the crosslinking density is increased, the texture of the film, and as well, various properties thereof may be assured. The aqueous polyurethane resin having a hydroxyl group is preferably contained in an amount of 5~20 wt %, based on the total weight of the aqueous coating composition. If the amount of aqueous polyurethane resin having a hydroxyl group is less than 5 wt %, the coating film becomes hard. On the other hand, if the amount exceeds 20 wt %, the coating film is softened, and thus it is difficult to assure adhesion and abrasion resistance.

The micronized silica dispersant used in the aqueous coating composition of the present invention, which serves to decrease emulsification of the coating film, includes typical micronized silica dispersants known in the art. The micronized silica dispersant preferably has an average particle size of 10~30 μm. If the average particle size of micronized silica dispersant is smaller than 10 μm, the light quenching effect is low due to insufficient light scattering properties. On the other hand, if the average particle size is larger than 30 μm, the surface of the coating film is roughened, thus causing a poor outer appearance and low scratch resistance. The micronized silica dispersant is preferably contained in an amount of 5~20 wt %, based on the total weight of the aqueous coating composition. If the amount of micronized silica dispersant is less than 5 wt %, the light quenching effect is decreased. On the other hand, if the amount exceeds 20 wt %, the amount of inorganic component in the coating film is increased, undesirably entailing cracks, a poor outer appearance, and low scratch resistance of the coating film.

The polyethylene paraffin wax dispersant used in the aqueous coating composition of the present invention includes typical polyethylene paraffin wax dispersants known in the art, and preferably has an average particle size of 30~100 nm. If the average particle size of polyethylene paraffin wax dispersant is smaller than 30 nm, a surface modification effect is low. On the other hand, if the average particle size is larger than 100 nm, the outer appearance of the coating film becomes poor. The polyethylene paraffin wax dispersant is preferably contained in an amount of 0.5~5 wt %, based on the total weight of the aqueous coating composition. If the amount of polyethylene paraffin wax dispersant is less than 0.5 wt %, a scratch improvement effect and anti-blocking, performance, which are the inherent properties of wax, are not exhibited. On the other hand, if the amount exceeds 5 wt %, phase separation and changes in viscosity may occur upon storage of the coating.

The polysiloxane surface controlling agent used in the aqueous coating composition of the present invention includes typical polysiloxane surface controlling agents known in the art. The polysiloxane surface controlling agent is preferably contained in an amount of 0.5~5 wt %, based on the total weight of the aqueous coating composition. If the amount of polysiloxane surface controlling agent is less than 0.5 wt %, the plastic material has poor wettability. On the other hand, if the amount exceeds 5 wt %, excess bubbles are generated, thus undesirably deteriorating the outer appearance.

The polyoxyethylene sorbitan monooleate stabilizer used in the aqueous coating composition of the present invention may include typical polyoxyethylene sorbitane monooleate known in the art. The polyoxyethylene sorbitan monooleate stabilizer is preferably contained in an amount of 0.5~5 wt %, based on the total weight of the aqueous coating composition. If the amount of polyoxyethylene sorbitan monooleate stabilizer is less than 0.5 wt %, the coating has poor storability. On the other hand, if the amount exceeds 5 wt %, the coating undesirably has high compatibility and viscosity.

The capsulated aromatic particles used in the aqueous coating composition of the present invention function to exhibit deodorization and prevent the generation of offensive odors. The capsulated aromatic particles are preferably contained in an amount of 0.0~1 wt %, based on the total weight of the aqueous coating composition. If the amount of capsulated aromatic particles is less than 0.01 wt %, effects of deodorization and prevention of offensive odors are insignificant. On the other hand, if the amount exceeds 1 wt %, effects of deodorization and prevention of offensive odors are not increased further.

The trifunctional hexamethlylenediisocyanate curing agent having a hydrophilic group used in the aqueous coating composition of the present invention may include typical components known in the art. The trifunctional hexamethylenediisocyanate curing agent having a hydrophilic group is preferably contained in an amount of 5~20 wt %, based on the total weight of the aqueous coating composition of the present invention. If the amount of trifunctional hexamethylenediisocyanate curing agent having a hydrophilic group is less than 5 wt %, a noncuring phenomenon occurs, and hence the outer appearance of the coating film is poor. Also, the appropriate crosslinking reaction with the main material does not occur, and it is thus difficult to assure the properties of the coating film. On the other hand, if the amount exceeds 20 wt %, due to the short bench time, poor workability or hard texture is caused, thus the inherent properties of the coating are not exhibited.

In addition, the aqueous coating composition of the present invention may further include a pigment and an additive known in the art, if necessary.

The aqueous coating composition for plastic automotive interiors has excellent outer appearance, adhesion, chemical resistance, weather resistance, and scratch resistance. When the user contacts the coating film, the user feels a texture similar to natural leather by virtue of the warm and soft feeling of the film. Further, since the composition includes the capsulated aromatic particles, offensive odors resulting from the presence of the non-reactive monomer of the aqueous acrylic resin or the solvent for use in the formation of the coating film may be drastically decreased.

A better understanding of the present invention may be obtained in light of the following examples which are set forth to illustrate, but are not to be construed to limit the present invention.

EXAMPLE 1

60 wt % of an aqueous polyurethane resin, 11.4 wt % of an aqueous polyurethane resin having a hydroxyl group (PU-200, available from DPI), 10 wt % of a micronized silica dispersant having an average particle size of 10 μm (Acematt TS 100, available from Degussa), 1.0 wt % of a polyethylene paraffin wax dispersant having an average particle size of 50 nm (Michem Emulsion 62330, available from Michelmnan), 1.0 wt % of a polysiloxane surface controlling agent (BYK331. available from BYK Chemical), 1.5 wt % of a polyoxyethylene sorbitan monooleate stabilizer (Tween 80, available from ICI), 0.1 wt % of an aqueous solution of lavender-aroma microcapsules, and 10 wt % of ion exchange water were mixed together. Subsequently, to the resulting mixture, 5 wt % of a trifunctional hexamethylenediisocyanate curing agent having a hydrophilic group was added, thus preparing a coating composition.

EXAMPLE 2

60 wt % of an aqueous polyurethane resin, 19.5 wt % of an aqueous polyurethane resin having a hydroxyl group, 10 wt % of a micronized silica dispersant having an average particle size of 10 μm, 1.0 wt % of a polyethylene paraffin wax dispersant having an average particle size of 50 nm, 1.0 wt % of a polysiloxane surface controlling agent, 1.5 wt % of a polyoxyethylene sorbitan monooleate stabilizer, 0.5 wt % of an aqueous solution of lavender-aroma microcapsules, and 6.5 wt % of ion exchange water were mixed together. Subsequently, to the resulting mixture, 10 wt % of trifunctional hexamethylenediisocyanate curing agent having a hydrophilic group was added, thus preparing a coating composition.

COMPARATIVE EXAMPLE 1

60 wt % of an aqueous polyurethane resin, 11.5 wt % of an aqueous polyurethane resin having a hydroxyl group, 10 wt % of a micronized silica dispersant having an average particle size of 10 μm, 1.0 wt % of a polyethylene paraffin wax dispersant having an average particle size of 50 nm, 1.0 wt % of a polysiloxane surface controlling agent, 1.5 wt % of a polyoxyethylene sorbitan monooleate stabilizer, and 10 wt % of ion exchange water were mixed together. Subsequently, to the resulting mixture, 5 wt % of trifunctional hexamethylenediisocyanate curing agent having a hydrophilic group was added, thus preparing a coating composition.

COMPARATIVE EXAMPLE 2

A commercially available oil coating SF-100 (available from Daihan Bee Chemical Co. Ltd.) was used.

EXPERIMENTAL EXAMPLE 1

Measurement of Properties

In order to evaluate the properties of the aqueous coating composition of the present invention, the following experiments were conducted.

The aqueous coating composition of each of the examples and comparative examples was applied onto a plastic substrate using a sprayer to a thickness of 20 μm based on the thickness of a dry film, dried at 80° C. for 20 min and then allowed to stand for 24 hours. The properties of the coating film thus obtained were measured as follows. The results are given in Table 1 below.

1) Outer Appearance

The coating composition was applied onto the plastic substrate, dried at 80° C. for 20 min, and then observed to determine whether bubbles, impurities, spots or grooves were formed and measured for the degree of smoothness and 60° gloss.

2) Adhesion

Based on a tape adhesion test according to ASTM D3359, tape was attached to 100 checks of the film, each having a size of 1mm×1 mm, and then removed, after which the number of peeled film checks was counted.

3) Chemical Resistance

The coating film was repeatedly rubbed 20 times with a soft cloth immersed in a 75% aqueous solution of each of isobutylalcohol, ethanol, and methanol, after which the results were observed.

4) Weather Resistance

This test was conducted on a black plate panel at 83±3° C. for 500 hours using a weather-proof tester and a Xenon light source, followed by observing whether problematic defects were actually created.

5) Scratch Resistance

A scratch measuring unit was mounted to a reciprocally moving device at 0.2 times/min under a stroke of 100 mm, and was then moved perpendicular to the coating film on the film under a load of 300 g, followed by observing whether the film was damaged.

6) Odor

The completely dried coating film was allowed to stand at room temperature for 7 days, cut to a 10 cm×10 cm square, placed into a sealed steel container, and then heated using a heater at 110° C. for 5 hours. Thereafter, the container was allowed to stand at room temperature for 2 hours and was then opened, and the extent of odor was evaluated.

TABLE 1

| | Outer Appearance | Adhesion | Chemical Resistance | Weather Resistance | Scratch Resistance | Odor |
|---|---|---|---|---|---|---|
| Ex. 1 | 5 | 5 | 5 | 5 | 4 | 5 |
| Ex. 2 | 5 | 4.5 | 5 | 5 | 5 | 5 |
| C. Ex. 1 | 5 | 5 | 5 | 5 | 5 | 4.5 |
| C. Ex. 2 | 4 | 5 | 5 | 5 | 4 | 3 |

Note:
good 5 ← ------ → 1 poor

As is apparent from Table 1, the coating film manufactured using the aqueous coating composition of the present invention does not cause offensive odors in a room after being dried, and has excellent outer appearance, adhesion, chemical resistance, weather resistance and scratch resistance.

As apparent from the foregoing, there is an advantage in the present invention in that the aqueous coating composition for plastic automotive interiors has excellent outer appearance, adhesion, chemical resistance, weather resistance and scratch resistance. When the user contacts the coating film, the user feels a texture similar to natural leather thanks to the warm and soft feeling of the film. Further, since the composition includes capsulated aromatic particles, offensive odors resulting from the presence of the non-reactive monomer of the aqueous acrylic resin or of the solvent for use in formation of the coating film may be drastically decreased.

What is claimed is:

1. An aqueous coating composition for plastic automotive interiors, comprising:
   1) 35~60 wt % with respect to the total weight of the aqueous coating composition of a component selected from the group consisting of aqueous polyurethane resins, aqueous acrylic resins, and mixtures thereof;
   2) 5~20 wt % with respect to the total weight of the aqueous coating composition of an aqueous polyurethane resin having a hydroxyl group;
   3) 5~20 wt % with respect to the total weight of the aqueous coating composition of a micronized silica dispersant having an average particle size of 10~30 μm;
   4) 0.5~5 wt % with respect to the total weight of the aqueous coating composition of a polyethylene paraffin wax dispersant having an average particle size of 30~100 nm;
   5) 0.5~5 wt % with respect to the total weight of the aqueous coating composition of a polysiloxane surface controlling agent;
   6) 0.5~5 wt % with respect to the total weight of the aqueous coating composition of a polyoxyethylene sorbitan monooleate stabilizer;

7) 0.01~1 wt % with respect to the total weight of the aqueous coating composition of capsulated perfume-containing particles; and
8) 5~20 wt % with respect to the total weight of the aqueous coating composition of a trifunctional hexamethylenediisocyanate curing agent having a hydrophilic group.

2. The aqueous coating composition for plastic automotive interiors according to claim 1, wherein the capsulated perfume-containing particles are lavender-aroma microcapsules.

* * * * *